United States Patent [19]
Hopkins

[11] Patent Number: 5,232,314
[45] Date of Patent: Aug. 3, 1993

[54] PARTICLE CONVEYING APPARATUS
[75] Inventor: Jeffrey M. Hopkins, Seymour, Ind.
[73] Assignee: Central Pharmaceuticals, Inc., Seymour, Ind.
[21] Appl. No.: 747,638
[22] Filed: Aug. 20, 1991
[51] Int. Cl.⁵ ............................................. B65G 53/52
[52] U.S. Cl. ..................................... 406/92; 406/153
[58] Field of Search .......................... 406/92, 153, 194

[56] References Cited
U.S. PATENT DOCUMENTS

| | | |
|---|---|---|
| 351,854 | 11/1886 | Delhaye . |
| 628,187 | 7/1899 | Sibley . |
| 671,774 | 4/1901 | Prosser ............................ 406/153 X |
| 1,083,138 | 12/1913 | Richard ........................... 406/194 X |
| 2,774,636 | 12/1956 | Whitlock . |
| 2,794,686 | 6/1957 | Anselman et al. ............... 406/92 X |
| 3,175,515 | 3/1965 | Cheely ............................ 406/153 X |
| 3,366,277 | 1/1968 | Barber ............................ 406/153 X |
| 3,876,352 | 4/1975 | DeTroyer et al. . |
| 4,105,256 | 8/1978 | Parker et al. . |
| 4,358,226 | 11/1982 | Nagata et al. . |
| 4,411,388 | 10/1983 | Muck . |

FOREIGN PATENT DOCUMENTS 147518  6/1990  Japan ..................................... 406/92
204217  8/1990  Japan ..................................... 406/92
459394  3/1975  U.S.S.R. ............................... 406/194

OTHER PUBLICATIONS
Nortel Machinery AIRMOVER Price List (2 pages).

Primary Examiner—David M. Mitchell
Assistant Examiner—Gary C. Hoge
Attorney, Agent, or Firm—Woodard, Emhardt, Naughton, Moriarty & McNett

[57] ABSTRACT

A particle conveying apparatus includes a transfer tube defining a flow passageway between inlet and outlet ends and defining a flow axis and includes a housing adapted for connection with a source of fluid pressure and for directing fluid from the fluid pressure source into the flow passageway between the inlet and outlet ends whereby the directed fluid travels spirally along the flow axis toward the outlet end. The housing defines a generally toroidal chamber surrounding the tube, the tube having an angled flow control slot providing communication between the chamber and the flow passageway, and the pressurized fluid is directed tangentially into the chamber to cause the fluid to enter the flow passageway through the slot in a spiraling direction toward the outlet end.

5 Claims, 4 Drawing Sheets

5,232,314

PARTICLE CONVEYING APPARATUS

BACKGROUND OF THE INVENTION

The present invention relates generally to particle conveying devices and more particularly to pneumatically assisted hopper filling devices for use in the pharmaceutically industry.

Pneumatic assisted conveying devices are well known in the art and provide an efficient and economical solution to the transportation of such materials. For example, U.S. Pat. No. 351,854 to Delhaye discloses a device for elevating and transporting granular matters to any height or distance by means of compressed air jets. Likewise, U.S. Pat. No. 628,187 to Sibley discloses a suction or injector conveyor elevating or conveying liquids or solids by pneumatic means.

A more recent example of a pneumatic conveyor is shown in U.S. Pat. No. 4,774,636 to Whitlock which discloses a hopper loader of the type that transports and elevates coarse or finely ground granularized or pelletized material. An apparatus for conveying electrostatically applied paint powder is disclose in U.S. Pat. No. 4,105,256 to Parker et al. In U.S. Pat. No. 3,876,352 to DeTroyer et al., a collecting mechanism for parts made by a powder compacting apparatus is disclosed where a portion of the mechanism consists of an aspirator that creates a partial vacuum to pick up small parts and transfer them to a discharge station. And, U.S. Pat. No. 4,358,226 to Nagata et al. discloses a method for conveying articles by air flow.

While devices such as these can provide a strong and reliable manner of moving particle matter, they are frequently too rough for certain more delicate materials such as gelatin capsules. This problem was addressed in U.S. Pat. No. 4,411,388 to Muck which shows an apparatus for conveying lightweight particulate matter which provides for minimal disruption of the structural integrity of the particles as they are being transported.

What is needed in an apparatus for conveying particle matter which minimizes damage to the conveyed material during operation.

SUMMARY OF THE INVENTION

An apparatus for conveying particles such a gelatin capsules includes a transfer tube defining a flow axis and a flow passageway between inlet and outlet ends and includes a housing defining a generally toroidal chamber surrounding the tube, the tube having a flow control slot angled toward the outlet end providing communication between the chamber and the flow passageway, and wherein the housing is adapted to connect with a source of fluid pressure to direct pressurized fluid tangentially into the chamber to cause the fluid to enter the flow passageway through the slot in a spiraling direction toward the outlet end. A manner of regulating the fluid pressure and mass flow rate of the motive fluid is provided by adjusting the size of the flow control slot which is defined between the inlet and outlet tube passageways.

It is an object of the present invention to provide an improved pneumatic particle conveying apparatus.

Another object of the present invention is to provide a particle conveying device which minimizes damage to the conveyed material during operation.

Related objects and advantages of the present invention will be apparent from the following description of the preferred embodiment.

DESCRIPTION OF THE PREFERRED EMBODIMENT

Figure 1:
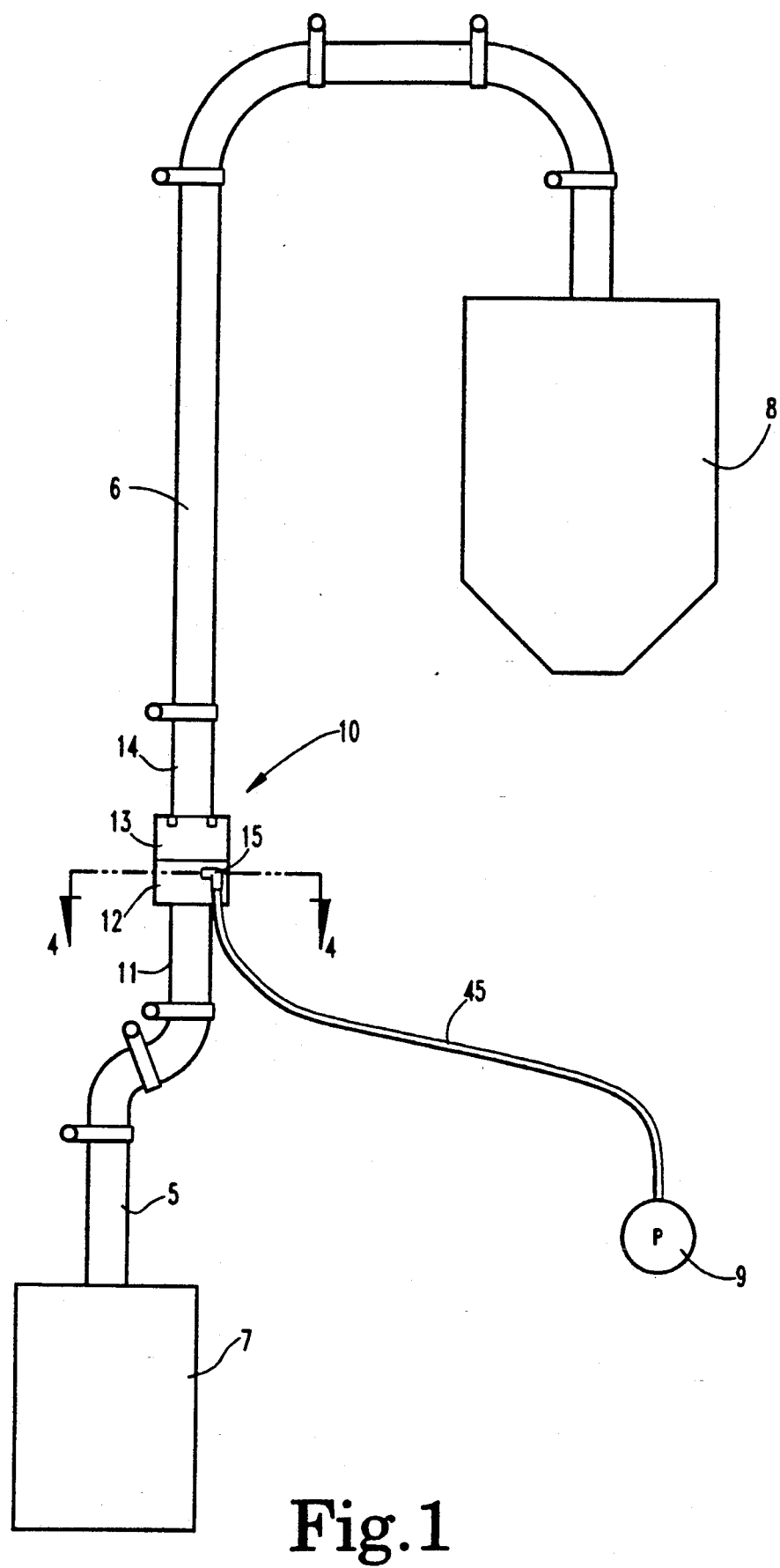
FIG. 1 is a diagrammatic elevational view of a particle conveying apparatus operationally as part of a hopper loader mechanism in accordance with the preferred embodiment of the present invention.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is shown an apparatus 10 for conveying particles or particle matter. In accordance with the preferred embodiment of the present invention, apparatus 10 is operational connected with lower and upper transport tubes 5 and 6, respectively, to comprise a hopper loader mechanism for transferring empty gelatin capsules from a fiber storage drum 7 to a receiving hopper 8 approximately six feet above the floor and drum 7. A fluid pressure source 9 provides compressed air to drive particle conveying apparatus 10. In use, empty gelatin capsules are drawn from fiber storage drum 7 through lower transport tube 5 and into apparatus 10, and are projected therefrom through upper transport tube 6 to receiving hopper 8. Particle conveying apparatus 10 generally includes an inlet tube 11, a lower housing 12, an upper housing 13, an outlet tube 14 and a fluid supply nozzle 15.

Figure 2:
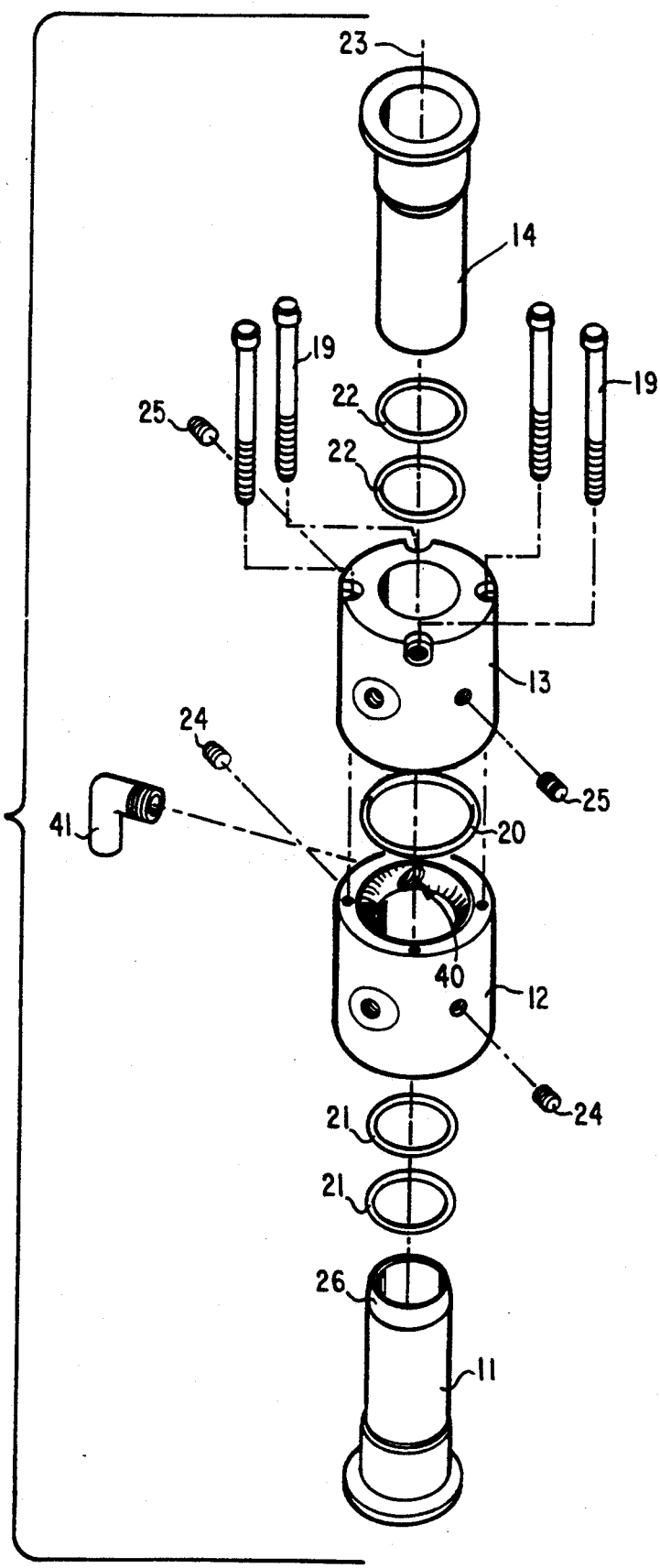
FIG. 2 is an exploded view of the particle conveying apparatus of FIG. 1.
Figure 3:
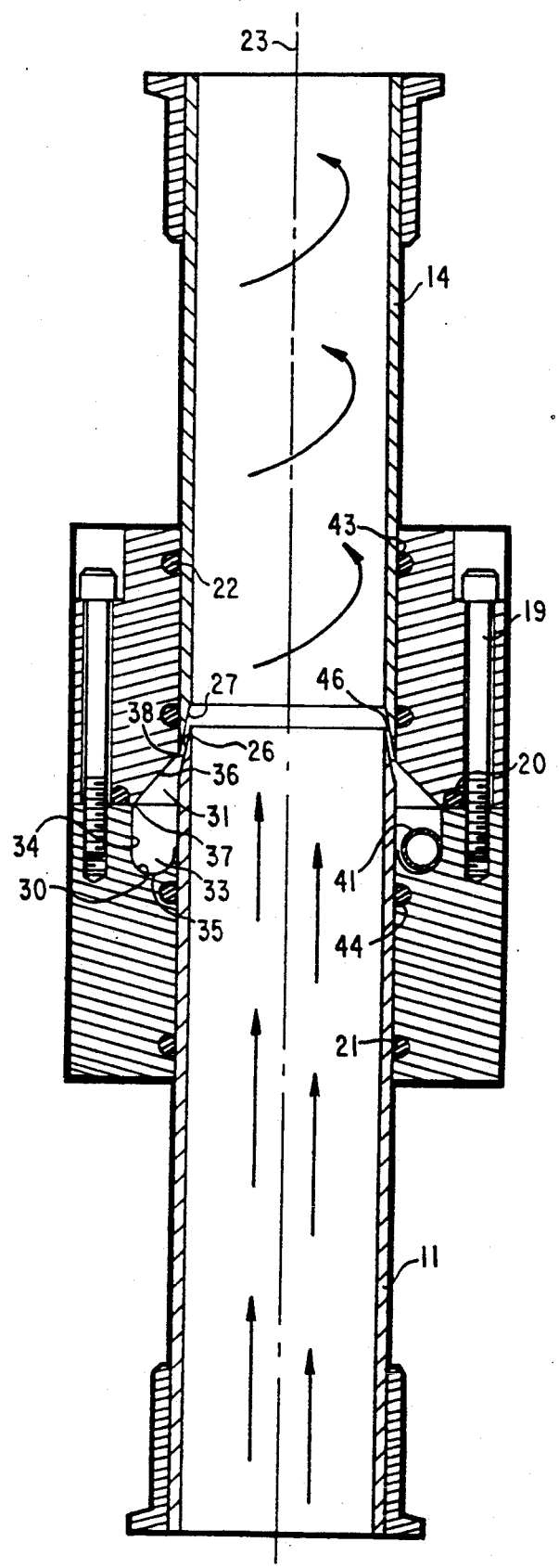
FIG. 3 is a side, cross-sectional view of the particle conveying apparatus of FIG. 1 and taken along the lines 3—3 of FIG. 4 and viewed in the direction of the arrows.
Figure 4:
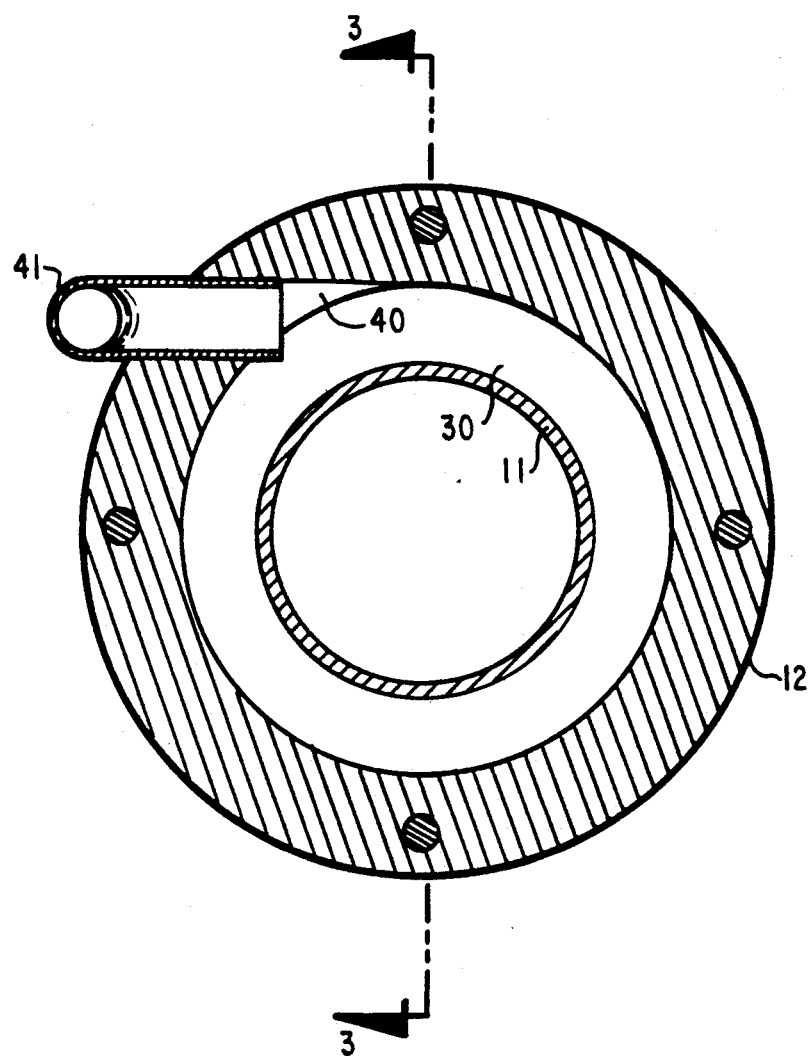
FIG. 4 is a cross-sectional view of the particle conveying apparatus of FIG. 1 taken along the lines 1—1 and viewed in the direction of the arrows.

Referring now to FIGS. 2-4, lower housing 12 and upper housing 13 are hollow cylinders made of FDA approved nylon such as 6—6 natural nylon, and have inner diameters roughly equal to each other and to the outer diameters of inlet tube 11 and outlet tube 14. Inlet and outlet tubes 11 and 14 are made of 316 stainless steel. Lower housing 12 and upper housing 13 are secured together by four circumferentially spaced housing bolts 19 with an o-ring housing seal 20 interposed therebetween to provide an air-tight seal. Inlet tube 11 is telescopically received within lower housing 12 with two o-ring inlet tube seals 21 interposed therebetween to provide an air-tight seal. Likewise, outlet tube 14 is telescopically received within upper housing 13 with a seal provided by two o-ring outlet tube seals 22. Assembled, tubes 11 and 14 define common flow axis 23.

Inlet and outlet tubes 11 and 14 may be fixed against any movement relative to their respective housings 12 and 13 each by a pair of opposing set screws 24 and 25, respectively. The use of set screws 24 and 25 allows both inlet tube 11 and outlet tube 14 to be adjusted upwardly or downwardly with respect to lower housing 12 and upper housing 13, respectively, to provide the desired vacuum pressure, as will be described below. Use of set screws 24 and 25 also facilitates removal of tubes 11 and 14 on a periodic basis for maintenance and cleaning. The upper end of inlet tube 11 is tapered inwardly to form an exteriorly facing, frustoconical surface 26 and the lower end of outlet tube 14 is complementarily tapered to form an inwardly facing frustoconical surface 27 to mate with surface 28.

Lower housing 12 defines an annular swirl recess 30 and upper housing 13 defines an annular compression recess 31 which aligns and cooperates with swirl recess 30 and with inlet tube 11 to define a toroidal-shaped swirl chamber 33. Swirl recess 30 opens generally upwardly and downwardly, has cylindrical outer walls 34, and a base 35 which has an upwardly opening generally semi-circular cross-section. Compression recess 31 opens generally downwardly and inwardly and has a generally frustoconical outer wall 36 which tapers from outer diameter ring 37 to inner diameter ring 38, forming an angle of approximately 45° with flow axis 23. Lower housing 12 further defines an inlet port 40 adapted to receive fluid supply nozzle 41 therein. Port 40 is aligned at the base of swirl recess 30 to admit the pressurized fluid from nozzle 15 tangentially into recess 30 and swirl chamber 33.

To assemble the particle conveying apparatus 10, outlet tube seals 22 are positioned within annular seal recesses 43 of upper housing 13 and outlet tube 14 is telescopically slid into housing 13 until the lower most end of the outlet tube is flush with inner diameter ring 38 of frustoconical wall 36. Set screws 25 of upper housing 13 are then tightened to secure outlet tube 14 to upper housing 13. With housing seal 20 seated within an annular seal recess in the bottom of upper housing 13, upper housing 13 is tightly secured to lower housing 12 by bolts 19. With inlet tube seals 21 seated within annular seal recesses 44 in inlet tube 11, tube 11 is telescopically slid into lower housing 12, up toward outlet tube 14, until tube 11 makes contact with outlet tube 14. Pressure source 9 via its hose 45 is connected to housing 12 by connecting fluid supply nozzle 41 into port 40. Compressed air is then fed into the swirl chamber 33, and inlet tube 11 is backed away from outlet tube 14 until the maximum or desired vacuum is created. When the desired vacuum is achieved, lower set screws 34 are tightened, securing inlet tube 11 is position relative to lower housing 12. An annular flow control slot 46 is created between mating frustoconical surfaces 26 and 27 by the mutual juxtaposition of tubes 11 and 14. The size of the slot may be varied by vertically adjusting tube 11 relative to lower housing 12.

With the components of particle conveying apparatus 10 assembled as described and as shown in FIGS. 1 and 3, compressed air enters swirl chamber 33 tangentially through fluid supply nozzle 15 and is thereby forced to rotate about the outside of inlet tube 11 and to travel through the tapered compression recess 31 in upper housing 13 before passing through flow control slot 46. The direction and orientation of the mating surfaces 26 and 27 of tubes 11 and 14 directs the pressurized air flow upwardly into outlet tube 14 which creates a vacuum pressure in inlet tube 11 and which draws the particle matter (here, gelatin capsules) upwardly from drum 7. The rotation of the pressurized air exiting flow control slot 46 continues into outlet tube 14 as an upwardly swirling or spiraling, particle conveying airflow which is believed to be less turbulent and more efficient than conventional particle conveying devices.

Alternative embodiments are contemplated where the inlet tube may be vertically adjusted relative to the lower housing by some manner of known adjustment such as a worm gear mechanism or a threaded adjustment collar mechanically juxtaposed between inlet tube 11 and lower housing 12.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A particle conveying apparatus, comprising:

a transfer tube defining a flow passageway between inlet and outlet ends and defining a flow axis; and flow directing means for connection with a source of fluid pressure and for directing fluid from the fluid pressure source into the flow passageway between the inlet and outlet ends whereby the directed fluid travels spirally along the flow axis toward the outlet end, wherein said flow directing means includes a housing surrounding said transfer tube, the housing defining a toroidal-shaped fluid flow chamber having a lower half and encircling said transfer tube, and wherein said transfer tube defines an opening providing communication between the chamber and the flow passageway, wherein said transfer tube includes an inlet tube with an upper flow control end and an outlet tube with a lower flow control end and an upper outlet end, and wherein the housing includes an upper and a lower housing member, the lower housing member having an upper surface, defining a lower central passageway for receiving the inlet tube, and defining an upwardly and inwardly opening swirl recess in communication with the lower central passageway, the recess having a cylindrical outer wall and a base with a semi-circular cross-section, and the recess defining the lower half of the fluid flow chamber.

2. The particle conveying apparatus of claim 1 wherein the upper housing member has a lower surface adapted to sealingly mate with the upper surface of the lower housing member, defines an upper central passageway for receiving the outlet tube, and defines a downwardly and inwardly opening compression recess in communication with the upper central passageway, the compression recess having a frustoconical outer wall and sized to mate with the swirl recess.

3. The particle conveying apparatus of claim 2 wherein the upper flow control end extends upwardly above the lower surface of the upper housing.

4. The particle conveying apparatus of claim 3 wherein said lower housing includes a fluid pressure inlet port in communication with the swirl recess and adapted to connect with the fluid pressure source, said port oriented to direct incoming pressure fluid in a direction not intersecting the flow axis.

5. The particle conveying apparatus of claim 4 wherein the opening between the chamber and the flow passageway is a flow control slot defined between the upper and lower flow control ends and wherein at least one of the inlet and outlet tubes may be adjusted with respect to one another to increase or decrease the size of said annular flow control slot.

* * * * *

UNITED STATES PATENT AND TRADEMARK OFFICE
CERTIFICATE OF CORRECTION

PATENT NO. : 5,232,314

DATED : August 3, 1993

INVENTOR(S) : Jeffrey Mark Hopkins

It is certified that error appears in the above-identified patent and that said Letters Patent is hereby corrected as shown below:

Column 1, Line 8, change pharmaceutically to --pharmaceutical--

Column 1, Line 20, change 4,774,636 to --2,774,636--

Column 1, Line 24, change disclose to --disclosed--

Column 3, Line 12, change 28 to --26--

Signed and Sealed this

Twenty-sixth Day of April, 1994

Attest:

BRUCE LEHMAN

Attesting Officer     *Commissioner of Patents and Trademarks*